United States Patent [19] [11] Patent Number: 5,091,650
Uchida et al. [45] Date of Patent: Feb. 25, 1992

[54] RADIATION DETECTOR USING SCINTILLATOR ARRAY

[75] Inventors: Hiroshi Uchida; Tomohide Omura, both of Hamamatsu, Japan

[73] Assignee: Hamamatsu Photonics K. K., Shizuoka, Japan

[21] Appl. No.: 624,956

[22] Filed: Dec. 10, 1990

[30] Foreign Application Priority Data

Dec. 15, 1989 [JP] Japan ................................ 1-325293

[51] Int. Cl.⁵ .............................................. G01T 1/20
[52] U.S. Cl. .............................. 250/366; 250/363.03; 250/367
[58] Field of Search ..................... 250/363.03, 367, 366

[56] References Cited

U.S. PATENT DOCUMENTS

| 4,394,576 | 7/1983 | Tanaka et al. | 250/366 |
| 4,743,764 | 5/1988 | Casey et al. | 250/363.03 |
| 4,749,863 | 6/1988 | Casey et al. | 250/363.03 |
| 4,750,972 | 6/1988 | Casey et al. | 156/645 |
| 4,823,016 | 4/1989 | Yamashita et al. | 250/363.03 |
| 4,870,280 | 9/1989 | Yamashita et al. | 250/368 |
| 4,929,835 | 5/1990 | Yamashita et al. | 250/367 |

FOREIGN PATENT DOCUMENTS

| 56-48560 | 5/1981 | Japan . | |
| 58-216974 | 12/1983 | Japan | 250/367 |
| 62-129776 | 6/1987 | Japan . | |
| 62-135787 | 6/1987 | Japan | 250/363.03 |

OTHER PUBLICATIONS

"A BGO Detector Unit for a Stationary High Resolution Positron Emission Tomograph", Seiichi Yamamoto, et al., *Journal of Computer Assisted Tomography*, (Sep./Oct. 1986) vol. 10, No. 5 pp. 851–855.

"An evaluation of a Two-Dimensional array Detector for High Resolution PET", Magnus Dahlbom and Edward J. Hoffman, *IEEE Transactions on Medical Imaging*, vol. 7, No. 4, (Dec. 1988) pp. 264–272.

"A Multicrystal Two Dimensional BGO Detector System for Positron Emission Tomography", M. E. Casey and R. Nutt, *IEEE Transactions on Nuclear Science*, vol. 33, No. 1, (Feb. 1986) pp. 460–463.

*Primary Examiner*—Constantine Hannaher
*Attorney, Agent, or Firm*—Sughrue, Mion, Zinn, Macpeak & Seas

[57] ABSTRACT

A radiation detector comprising a scintillator array for emitting scintillation light upon incidence of radiation to a scintillator and distributing the scintillation light to the other scintillators at a predetermined distribution ratio and plural photomultiplier tubes optically coupled to the scintillator array for converting the scintillation light into an amplified electrical signal representing an incident position of the radiation to the scintillator array. The scintillator array comprises plural scintillators, and each pair of neighboring scintillators have coupling surface on both of confronting surfaces thereof for optically coupling the neighboring scintillators therethrough, each of the coupling surfaces having at least one of a roughened surface and a mirror-polished surface having different transmissivities to light passing therethrough to thereby adjust the distribution ratio of the scintillation light transmitted from one of the scintillators to another.

11 Claims, 4 Drawing Sheets

FIG. 4(A)  FIG. 4(B)  FIG. 4(C)
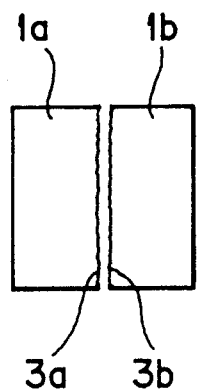
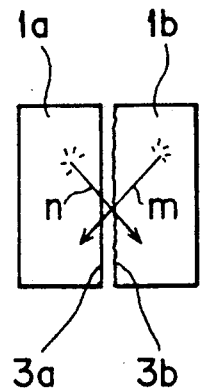
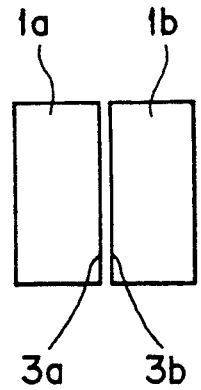
FIG. 4(D)  FIG. 4(E)  FIG. 4(F)
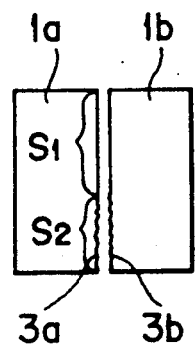
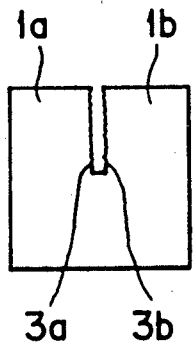
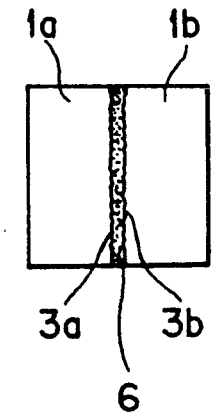

RADIATION DETECTOR USING SCINTILLATOR ARRAY

BACKGROUND OF THE INVENTION

This invention relates to a radiation detector, and more particularly to a radiation detector using a scintillator array such as positron emission tomography for detecting a location of radiation incident to the scintillation array.

There has been developed a new technical field of nuclear medicine for diagnosing and curing a disease of a human body using radioisotope (RI). As one of techniques which belong to this technical field a positron emission tomography (PET) is used for detecting an emitting location of radiation such as gamma-rays with a scintillator.

The positron emission tomography is a type of nuclear imaging apparatus used especially in medical diagnostics and research imaging. In the positron emission tomography, one type of radioactive compound a drug labeled with a nuclide having positron emission capability ) is administered to a patient or other living organism under surveillance. Positrons are positively charged particles, and are emitted from the nuclide of the radioactive compound as isotope decay within the body. Upon emission, the positron encounters an electron, and both are annihilated. As a result of one annihilation, gamma-rays are generated in the form of two photons which travel in approximate opposite directions (about 180 degrees) to one another. Traditionally, the apparatus is disposed so as to surround the body to accumulate information concerning the lines of travel of the emitted photons at different angles around the body under surveillance and process this information through a computer, whereby a tomographic image of the distribution and concentration of the nuclide is obtained and at the same time is two dimensionally displayed together with a sliced image of the body. In this connection, the PET scanner can observe and quantify biochemical and physiological changes that occur naturally and in disorders in the human body or the like.

An amount of the drug to be administered into the patient or the like is preferably smaller to avoid the influence of the nuclide on the body, however, a smaller amount of the drug causes the emitted radiation to be further reduced in intensity. Accordingly, the radiation detector is required to effectively detect the radiation of weak intensity emitted from the body.

In order to satisfy such a requirement in the art, a gamma-rays detector having an inorganic scintillation crystal such as thallium-activated sodium iodide (NaI(Tl)), $Bi_4Ge_3O_{12}$(BGO), CsF or the like as a scintillator has been utilized as a radiation detector. The gamma-rays detector comprises plural scintillators arranged one or two-dimensionally for converting gamma-rays emitted from the body to a dispersely-emitting scintillation light, and plural photomultiplier tubes (PMT) optically coupled to the scintillators for converting the scintillation light into electrons and multiplying them. In this gamma-rays detector, the scintillation light emitted from one scintillator of the one- or two-dimensionally arranged scintillator array is distributed to the other scintillators in a predetermined distribution ratio and then guided to the photomultiplier tubes corresponding to the respective scintillators, so that amplified electrical signals having statistical information on an incident position of the gamma rays to the scintillator array (that is, a scintillation location) are outputted from the respective photomultiplier tubes. The position of the gamma-rays incident to the scintillator array (the scintillation location) is statistically determined on the basis of the electrical signals. The gamma-rays detector thus constructed enables a detection resolution to be more enhanced, however, simultaneously causes the scintillation light to be attenuated through a distributing process in which the scintillation light generated in one scintillator is distributed to the other scintillators and a guiding process in which the distributed scintillation lights is guided to the photomultiplier tubes. Accordingly, it has been required for this type of gamma-rays detector to prevent the attenuation of the scintillation light particularly through the distributing process and optimumly carry out the distributing process.

Various types of radiation detectors each utilizing an scintillator array and a photomultiplier tube in combination, for example as shown in FIGS. 1 to 3, have been proposed in order to satisfy the above requirement The radiation detector as shown in FIG. 1 includes a scintillator array 1 comprising one-dimensionally arranged four scintillators $1_1$ to $1_4$, and two photomultiplier tubes $2_1$ and $2_2$ one of which is optically coupled to a half (two scintillators) of the scintillator array 1 and the other of which is optically coupled to the other half (the other two scintillators). The scintillator array 1 is provided with a reflection layer at each of the interfaces (coupling surfaces) $3_1$ and $3_3$ between the neighboring scintillators $1_1$ and $1_2$ and between the neighboring scintillators $1_3$ and $1_4$, and further provided with a predetermined area ratio of a reflection layer and a transmission layer at an interface (coupling surface) $3_2$ between the neighbor scintillators $1_2$ and $1_3$. Accordingly, the scintillators $1_1$ and $1_4$ are optically separated from the scintillators $1_2$ and $1_3$ through the reflection layers, respectively, but the scintillators $1_2$ and $1_3$ are optically coupled through the transmission layer to each other. That is, a scintillation light emitted from one of the four scintillators $1_1$ to $1_4$ is not distributed (transmitted) to the other scintillators through the reflection layers, while a scintillation light emitted from one of the scintillators $1_2$ and $1_3$ is distributed (transmitted) through the transmission layer to each other. In this case, a distribution ratio of the scintillation light corresponds to the area ratio of the reflection and transmission layers provided at the interface (coupling surface) $3_2$. This radiation detector is described in detail in Japanese Unexamined Published Patent Application No. 62-135787.

The radiation detector as shown in FIG. 2 includes a scintillator having plural grooves (slits) 4 obtained by vertically cutting the scintillator in different depths, and two photomultiplier tubes, one of which is optically coupled to a half of the scintillator 1 and the other of which is optically coupled to the other half. The grooves 4 are provided with reflection agent which serves to guide a scintillation light generated within the scintillator toward the photomultiplier tubes while distributing the scintillation light to the other scintillators and the corresponding photomultiplier tubes in a suitable distribution ratio. This type of radiation detector is described in detail in U.S. Pat. No. 4,749,863, and in "IEEE Transactions on Medical Imaging", Vol. 7, No. 4, 1988, pp 264–272.

The radiation detector as shown in FIG. 3 includes a scintillator array comprising plural scintillators $1_{11}$ to $1_{44}$ which are three-dimensionally arranged, plural photomultiplier tubes $2_1$ and $2_2$ and a light guide 5, sandwiched between the scintillator array and the photomultiplier tubes, for guiding a scintillation light emitted from the scintillator array to the photomultiplier tubes. The light guide may be used one as shown in "IEEE Transactions on Nuclear Science" Vol. 33, No. 1, February 1986, pp 446–451, pp 460–463. In this type of scintillator array, the interfaces (coupling surfaces) between the respective neighboring scintillators are filled (or coated) with the reflection agent. This type of radiation detector is described in detail in Japanese Unexamined Published Patent Application No. 62-129776, in "IEEE Transactions on Nuclear Science", Vol. 33, No. 1, February 1986 and in "IEEE Transactions on Medical Imaging", Vol. 7, No. 4, December 1988. In place of the flat-plate type light guide, a light guide comprising plural segments each having a complicated shape as described in "IEEE Transactions on Nuclear Science", Vol. NS-34, No. 1, February 1987 may be used to distribute a scintillation light emitted from one of the scintillators to the other scintillators in different distribution ratios.

In all of the radiation detectors as described above, the interfaces (coupling surfaces) between the neighboring scintillators are filled (or coated) with the reflection agent to adjust the distribution of scintillation light between the respective neighboring scintillators. The reflection agent has a capability of reflecting incident light therefrom with no leak, but has a little light-absorption property. The light-absorption of the reflection layer is more remarkable as the scintillator or scintillator array is more minutely segmented into plural scintillator units. Further, particularly in a case where a light guide is provided between the scintillator array and the photomultiplier tubes as shown in FIG. 3, light-absorption also occurs in the light guide, so that the scintillation light is more extremely attenuated before transmitted to the photomultiplier tubes. Such attenuation of the scintillation light emitted from the scintillator array (that is, an optical loss) causes energy resolution and timing resolutions to be lowered, and further causes a discriminating characteristic of each scintillator to be degraded.

SUMMARY OF THE INVENTION

An object of this invention is to provide a radiation detector having a simple construction for accurately detecting a radiation-emitting location.

Another object of this invention is to provide a radiation detector in which an optical loss is more remarkably reduced.

In order to attain the above objects, a radiation detector according to this invention comprises a scintillator array comprising plural scintillating portions each for emitting scintillation light upon incidence of radiation thereto, and plural light distributing portions each including at least two coupling surfaces for optically coupling scintillating portions adjacent to each other and distributing the scintillation light emitted in one scintillating portion to the other scintillating portion at a distribution ratio, the scintillating portions and said light distributing portions being alternately arranged and each of the coupling surfaces having at least one of a roughened surface and a mirror-polished surface having different transmissivities to light passing therethrough, thereby adjusting the distribution ratio of the scintillation light transmitted from one of the coupling surfaces to the other, and plural photomultiplier tubes optically coupled to the scintillator array for receiving the scintillation light distributed in the scintillator array and converting the scintillation light into an amplified electrical signal representing an incident position of the radiation to the scintillator array.

The scintillator array may comprise an assembly of plural scintillators or a scintillator having plural grooves therein. When the scintillator array comprises the assemble of the plural scintillators, a scintillating portion corresponds to a scintillator, and a distributing portion comprises both coupling surfaces of two adjacent scintillators. When the scintillator array comprises a scintillator having plural grooves therein, the scintillating portions correspond to any portions other than confronting walls defining the grooves in the scintillator and the distributing portions comprises the confronting surfaces and space therebetween.

BRIEF DESCRIPTION OF THE DRAWINGS

FIGS. 4(A) through 4(F) show various models of surface condition and coupling condition according to this invention;

DETAILED DESCRIPTION OF THE INVENTION

Figure 3:
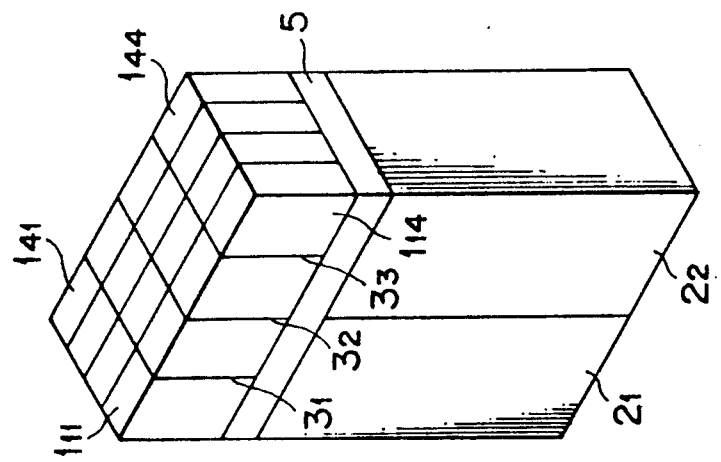
FIG. 3 shows another conventional radiation detector in which a light guide is provided to the radiation detector as shown in FIG. 1.
Figure 2:
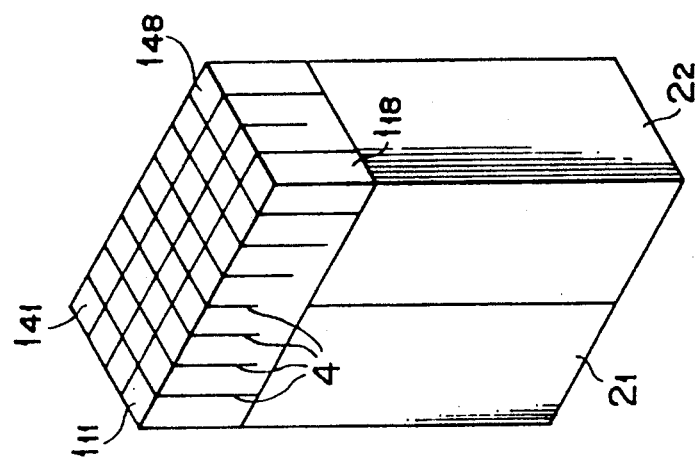
FIG. 2 shows another conventional radiation detector having a scintillator having plural grooves therein.
Figure 1:
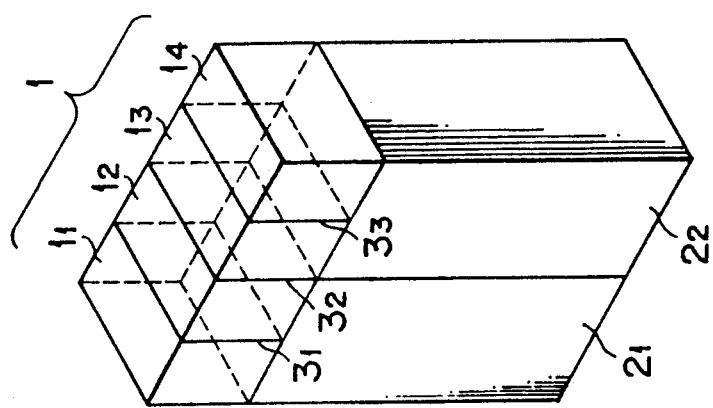
FIG. 1 shows a conventional radiation detector having an assembly of plural scintillators.

Preferred embodiments of this invention will be described hereunder with reference to the accompanying drawings.

Like the conventional radiation detector, in a radiation detector according to this invention, a scintillation light emitted from one of scintillators is distributed to the other scintillators in a predetermined distribution ratio and then the distributed scintillation lights are guided to plural photomultiplier tubes to obtain amplified electrical signals representing an emitting location of the scintillation light. However, unlike the conventional radiation detector, the distribution ratio of a scintillator array of this invention is not adjusted with reflection agent, but by means of the following two factors (surface condition and a coupling condition of an interface (a coupling surface) between respective neighboring scintillators). The surface condition is defined by a sectional profile of the coupling surface such as a rough surface, a mirror-polished surface or the like, and the coupling condition is defined by a substance (or refractive index of the substance) to be provided to the coupling surface such as an air, or a coupling agent such as water, silicone oil or RTV rubber. In this case, the refractive indexes of the scintillator (BGO), silicone oil (RTV rubber) and water are 2.15, 1.45 and 1.33, respectively. Accordingly, the distribution ratio is freely variable by changing the surface condition of each coupling surface and/or changing the substance to be provided between the neighboring scintillators.

FIGS. 4(A) to 4(F) show various types of models applicable to a scintillator array used in this invention. In order to explain the change of the light-transmissivity through the coupling surface in accordance with variation in the surface condition and the coupling condition of the scintillators 1a and 1b, each model is shown to have a common construction in which two scintillators 1a and 1b are optically uncoupled to each other through coupling surfaces 3a and 3b thereof.

A first model as shown in FIG. 4(A) includes two scintillators each having a roughly-designed coupling surface. A second model as shown in FIG. 4(B) includes a scintillator having a mirror-polished coupling surface and the other scintillator having a roughly-designed coupling surface. Further, a third model as shown in FIG. 4(C) includes two scintillators each having a mirror-polished coupling surface. Air is filled in a gap between the faced coupling surfaces of the scintillators in each of the first to third models, that is, an air layer is provided between the coupling surfaces.

With respect to the surface condition, the light-transmissivity through the coupling surface, that is, the distribution ratio of light is increased in each coupling surface as a occupied area of the rough coupling surface is increased or as the coupling surface of the scintillator is rougher. Accordingly, the light-transmissivity through the coupling surfaces of the neighboring scintillators is decreased in the order of the first to third models. That is, the first model having two rough coupling surfaces has the highest light-transmissivity, while the third model having two mirror-polished coupling surfaces has the lowest light-transmissivity. Further, a degree of the roughness of the coupling surface may be adjusted by changing the diameter of grinding particles which are used to grind the coupling surface. The desired size of the grinding particles is preferably #1000 in the JIS (Japan Industrial Standard).

In a case where the two scintillators having different surface condition are used as shown in the second model, a transmissivity of light (m) which is transmitted from the scintillator having the rough coupling surface 3b to the other scintillator having the mirror-polished coupling surface 3a a little higher than that of light (n) which has an opposite transmission direction to that of the light (m).

In addition, the light-transmissivity between the neighboring scintillators is more finely adjusted by changing an area ratio of the mirror-polished and rough surfaces to be formed on a coupling surface of each scintillator. FIG. 4(D) shows a fourth model including two scintillators each having a coupling surface on which both of a mirror-polished surface portion S1 and a rough surface portion S2 are formed in each scintillator in a predetermined area ratio (S1:S2). In this model, the mirror-polished surface portion and the rough surface portion on the coupling surface of one scintillator are completely confronted to those on the coupling surface of the other. That is, the fourth model as shown in FIG. 4(D) corresponds to a model in which a combination of the first and third models as shown in FIGS. 4(A) and 4(C) is applied to each coupling surface. However, a confronting relationship between the mirror-polished surface and rough surface portions is not limited to the above model. For example, another confronting relationship as shown in FIG. 4(B), in which a mirror-polished surface portion on a coupling surface confronts a rough surface portion of the other coupling surface, may be adopted in combination with the confronting relationships as shown in FIG. 4(D). Further, FIG. 4(E) shows a fifth model including a scintillator having a groove therein. In this model, the faced inner walls of the groove serves as coupling surfaces, and the light-transmissivity through the coupling surfaces is changed by changing a depth of the groove.

The surface condition between the neighboring scintillators is adjusted by utilizing the first to fifth models alone or in combination to more finely change the light-transmissivity between the scintillators, that is, the distribution ratio of a scintillation light.

In addition to the above manner, the light-transmissivity between the neighboring scintillators can be more minutely changed by changing a refractive index of a gap between the coupling surfaces of the neighboring scintillators.

In the first to fifth models, air is filled with each gap between the respective coupling surfaces. On the other hand, in a sixth model as shown in FIG. 4(F), an optical coupling agent 6 such as silicone oil, silicone grease or water is filled in the gap between the neighboring coupling surfaces or is coated to the coupling surfaces. The coating or filling of the optical coupling agent having a higher refractive index than the air to the coupling surfaces or in the gap therebetween enables the light-transmissivity therebetween to be higher than when air is filled in the gap, and thus the distribution ratio of the light is increased.

Figure 6:
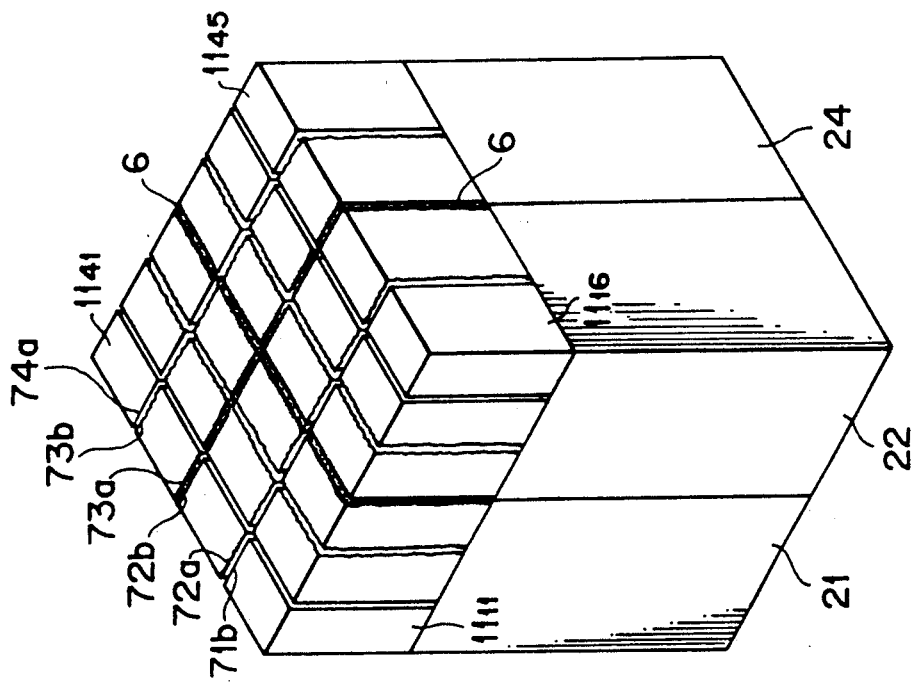
FIG. 6 shows a second embodiment of the radiation detector according to this invention.
Figure 5:
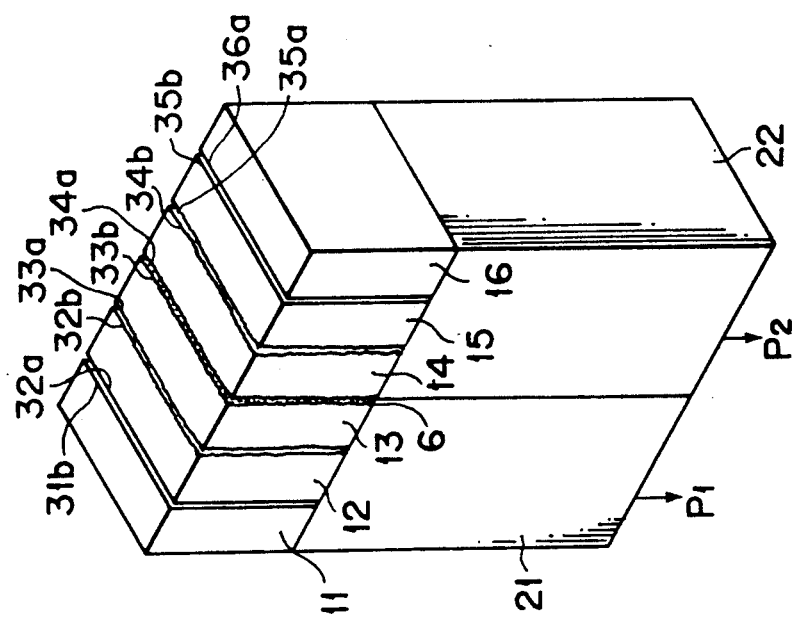
FIG. 5 shows a first embodiment of the radiation detector according to this invention.

FIGS. 5 and 6 show two embodiments of the radiation detector according to this invention.

The radiation detector of the first embodiment includes a pair of photomultiplier tubes 21 and 22, and a scintillator array comprising six scintillators 11 to 16 each of which has the same shape. One half of the scintillator array (three scintillators 11 to 13) is mounted on the photomultiplier tube 21 and the other half (the other three scintillators 14 to 16) is mounted on the other photomultiplier tube 22. These scintillators 11 to 16 are optically coupled to one another through respective coupling surfaces 31b to 36a between the respective neighboring scintillators.

In this scintillator array, each of the four coupling surfaces 31b, 32a, 35b and 36a which are disposed most apart from the center of the scintillator array is designed so as to be a mirror-polished surface. Gaps between these faced coupling surfaces are filled with air. That is, each of two pairs of the neighboring scintillators 11 and 12 and the neighboring scintillators 15 and 16 corresponds to the third model as shown in FIG. 4(C). On the other hand, each of other four coupling surfaces 32b, 33a, 34b and 35a which are near to the center of the scintillator array is designed to be a rough surface. Gaps between these faced coupling surfaces are also filled with air. That is, each of the two pairs of the neighboring scintillators 12 and 13 and the neighboring scintillators 14 and 15 corresponds to the first model as shown in FIG. 4(A). Further, each of a pair of the coupling surfaces 33b and 34a which are disposed at the center of the scintillator array is designed to be a rough surface. The gap between the coupling surfaces is filled with an optical coupling agent having higher refractive index than air after plural scintillators are assembled into the scintillator array, or the coupling surfaces 33b and 34a are coated with the optical coupling agent before the scintillators are assembled. Accordingly, the scintillator array of this embodiment has a construction that the light-transmissivity (that is, the distribution ratio) is intermittently more increased as approaching from both sides of the scintillator array toward the center thereof.

An identification capability (characteristic) of the radiation detector thus constructed was estimated by irradiating gamma-rays to each of the scintillators 11 to 16 of the radiation detector to emit a scintillation light in the scintillator and then obtaining output signals from the two photomultiplier tubes 21 and 22. That is, representing relative intensities of the output signals of the photomultiplier tubes 21 and 22 by P1 and P2, respectively, the identification characteristic of the radiation detector was estimated with values of DC(P1) or DC(P2) defined by the following equation:

$$DC(P1)=P1/(P1+P2)\times 100, \text{ or}$$
$$DC(P2)=P2/(P1+P2\times 100$$

The DC(P1) or DC(P2) mean contributive degrees of the scintillation light emitted in one scintillator to the output electrical signals of the photomultiplier tubes P1 and P2, respectively. For example, in a case of the DC(P1), the scintillation light emitted in one scintillator is distributed in a predetermined distribution ratio to all scintillators 11 to 16 and a part of the distributed scintillator light is guided through the scintillators 11 to 13 to the photomultiplier tube 21, so that an electrical signal having an intensity corresponding to the part of the scintillation light is outputted from the photomultiplier tube 21. Accordingly, a distribution ratio of the scintillation light emitted in each of the scintillators to each of the photomultiplier tubes 21 and 22 is determined by detecting an output signal of each of the photomultiplier tubes 21 and 22 at the time when gamma-rays is irradiated to each of the scintillators.

A detection result of the value DC(P1) was as follows: DC(P1)=89, 76, 61, 37, 20 and 11 for the irradiation of the gamma-rays to the scintillators 11 to 16, respectively. It is apparent from the above values of DC(P1) that the incidence of the gamma-rays to the scintillators can be positionally clearly discriminated by the two photomultiplier tubes 21 and 22. The same detection result was obtained by the photomultiplier tube 22.

FIG. 6 shows a second embodiment of the radiation detector according to this invention.

In this embodiment, the radiation detector includes a scintillator array comprising two-dimensionally arranged plural (24) scintillators $11_{11}$ to $11_{46}$, and four photomultiplier tubes 21 to 24 each optically coupled to an equal number (6) of scintillators. This radiation detector has a construction where a plurality of one-dimensionally arranged scintillator arrays (for example, in an X-direction) as shown in FIG. 5 are arranged in a Y-direction to form a two-dimensionally arranged scintillator array. Accordingly, the surface condition and the coupling condition of the neighboring scintillators of the scintillator array of this embodiment are identical to those of the scintillator array of the first embodiment in the X-direction. In the arrangement of the scintillators in the Y-direction, six pairs both coupling surfaces 72b and 73a which are disposed at the center of the scintillator array in the Y-direction and aligned with one another in the X-direction are designed to be rough surfaces, and these coupling surfaces are coated with the optical coupling agent 6 or gaps therebetween are filled with the optical coupling agent 6. On the other hand, in the other pairs of the coupling surfaces 71b and 72a (73b and 74a) which are disposed at the side portion of the scintillator array in the Y-direction, the outer coupling surfaces 71b and 74a of the respective pairs are mirror-polished while the inner coupling surfaces 72a and 73b are roughly formed. Gaps between these pairs of the coupling surfaces disposed at the side portion of the scintillator array are filled with air. This arrangement enables the four photomultiplier tubes 21 to 24 to discriminate 24 scintillators accurately.

In the above embodiments, the models as shown in FIGS. 4(A) to 4(C) and 4(F) are used in combination to construct the scintillator array. However, in order to finely control the distribution ratio of the scintillation light to the other scintillators, the models as shown in FIGS. 4(D) and 4(E) may be also used along or in combination with the above models. Further, in order to more finely change the light-transmissivity (distribution ratio) of the coupling surfaces, the degree of the roughness of the rough coupling surfaces may be changed, various optical coupling agents having different refractive indexes may be used, or the optical coupling agent may be partly coated to some coupling surfaces (or filled in the gaps therebetween) and the air may be filled in the gaps between the other coupling surfaces).

Figure 7:
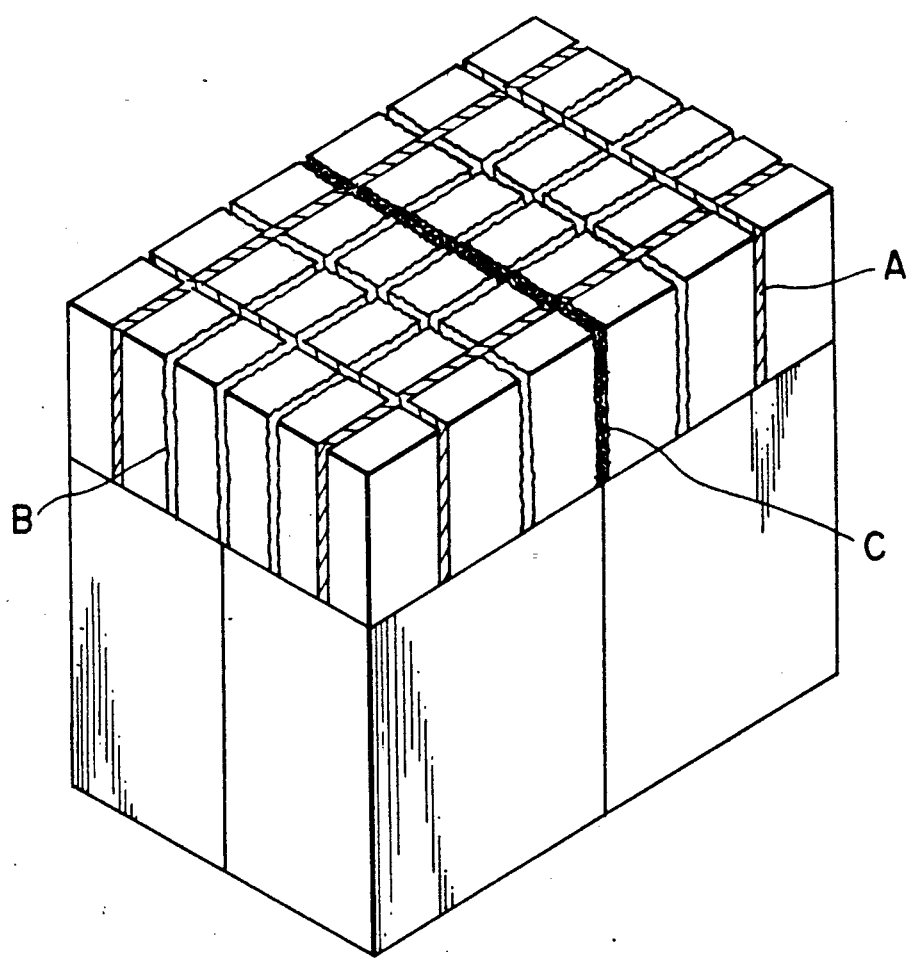
FIG. 7 shows a scintillator arrangement of a third embodiment of the radiation detector.

FIGS. 7 shows a third embodiment of the scintillator array according to this invention. The scintillator array of this embodiment comprises 6×6 (=36) scintillators arranged two-dimensionally, and four photomultipliers each of which are arranged so as to be confront with six scintillators. As shown in FIG. 7, mirror-polished surfaces are formed at the four outer side surfaces of the scintillator array to prevent a leak of the scintillation light from the side surfaces to the outside and at confronting coupling surfaces (as shown by oblique lines A) nearest to the outer side surfaces. That is, a full masking (defined as a coupling portion comprising confronting coupling surfaces which are mirror-polished) is formed at the side portion of the scintillator array. On the other hand, roughened surfaces are formed at the other confronting coupling surfaces (B) (as shown by saw-shaped lines). Particularly, RTV rubber is provided between the coupling surfaces (C) at the center of the scintillator array.

As described above, according to the radiation detector of this invention, a distribution ratio between the neighboring coupling surfaces can be freely and finely changed with no reflection layer, so that the distribution of the scintillation light is more effectively performed without attenuation of the light to improve energy resolution, timing resolution and crystal identification characteristics. Further, no requirement of the reflection layer enables the scintillators to be minutely arranged and thus non sensitive region of the scintillators can be reduced. Still further, the radiation detector of this invention does not need a scintillator array having a complicated structure, and therefore manufacturing of a scintillator array can be easily performed.

What is claimed is:

1. A radiation detector for detecting an incident position of radiation, comprising:
a scintillator array comprising plural scintillators for generating scintillation light upon incidence of radiation to a scintillator and distributing the scintillation light to the other scintillators at a predetermined distribution ratio, each of said scintillators having a radiation receiving surface for receiving the radiation therethrough, a light-emitting surface for emitting the scintillation light guided along an inside of the scintillator in a first direction and at least one light-distributing surface for transmitting a part of the scintillation light therethrough to the other scintillators in a second direction traverse to the first direction to distribute the scintillation light to the other scintillators at the predetermined distribution ratio, said light-distributing surface serving as a coupling surface through which each of said scintillators is optically coupled to one of the other scintillators, and said light-distributing surface comprising at least one of a roughened surface, a mirror-polished surface and a combination thereof each of which is variable in transmissivity to light passing therethrough to thereby adjust the distribution ratio of the scintillation light transmitted from one of the scintillators to another in the second direction; and plural photomultiplier tubes optically coupled to said scintillator array for receiving the scintillation light distributed in said scintillator array and converting the scintillation light into an amplified electrical signal representing an incident position of the radiation to said scintillator array.

2. A radiation detector as claimed in claim 1, wherein at least one of air and an optical coupling agent having a refractive index different from that of the air is provided between said coupling surfaces of each pair of said neighboring scintillators to transmit the scintillation light therethrough between said coupling surfaces at transmissivity dependent on each refractive index of said air and said optical coupling agent.

3. A radiation detector as claimed in claim 2, wherein said optical coupling agent is any substance selected from the group consisting of silicone oil, silicone grease, water and a combination thereof.

4. A radiation detector as claimed in claim 1, wherein each of said coupling surfaces has both of the roughened surface and the mirror-polished surface in a predetermined area ratio.

5. A radiation detector for detecting an incident position of radiation, comprising:

a scintillator array comprising plural scintillating portions each for generating scintillation light upon incidence of radiation thereto and distributing the scintillation light to the other scintillators at a predetermined distribution ratio, each of said scintillating portions having a radiation receiving surface for receiving the radiation therethrough, a light-emitting surface for emitting the scintillation light guided along an inside of the scintillating portion in a first direction and at least one light-distributing surface for transmitting part of the scintillation light therethrough to the other scintillating portions in a second direction transverse to the first direction to distribute the scintillation light to the other scintillating portions at the predetermined distribution ratio, said light-distributing surface serving as a coupling surface through which each of said scintillating portions is optically coupled to one of the other scintillating portions, and said light-distributing surface comprising at least one of a roughened surface, a mirror-polished surface and a combination thereof each of which is variable in transmissivity to light passing therethrough to thereby adjust the distribution ratio of the scintillation light transmitted from one of said scintillating portions to the other in the second direction; and plural photomultiplier tubes optically coupled to said scintillator array for receiving the scintillation light distributed in said scintillator array and converting the scintillation light into an amplified electrical signal representing an incident position of the radiation to said scintillator array.

6. A radiation detector as claimed in claim 5, wherein each of said light-distributing portions further includes between said coupling surfaces at least one of air layer and an optical coupling agent layer having a refractive index different from that of the air layer is provided to transmit the scintillation light therethrough between said coupling surfaces at transmissivity dependent on each refractive index of said air and said optical coupling agent.

7. The radiation detector as claimed in claim 6, wherein said optical coupling agent is any substance selected from the group consisting of silicone oil, silicone-grease, water and a combination thereof.

8. The radiation detector as claimed in claim 5, wherein each of said confronting surfaces has both of the roughened surface and the mirror-polished surface in a predetermined area ratio.

9. The radiation detector as claimed in claim 5, wherein said scintillator array has plural grooves therein and said coupling surfaces comprises confronting walls of each of said groove.

10. A radiation detector as claimed in claim 9, wherein each of said grooves is provided with at least one of air and an optical coupling agent having a refractive index different from that of the air to transmit the scintillation light therethrough between said coupling surfaces at transmissivity dependent on each refractive index of said air and said optical coupling agent.

11. The radiation detector as claimed in claim 10, wherein said optical coupling agent is any substance selected from the group consisting of silicone oil, silicone-grease, water and a combination thereof.

* * * * *